United States Patent [19]

El-Ghatta et al.

[11] 3,996,165
[45] Dec. 7, 1976

[54] PROCESS FOR PREPARING PLATINUM METAL CATALYSTS

[75] Inventors: Hussain El-Ghatta, Chur, Grisons; Johann Karl Forrer, Domat-Ems, Grisons, both of Switzerland

[73] Assignee: Inventa AG fur Forschung und Patentverwertung, Zurich, Switzerland

[22] Filed: Dec. 24, 1974

[21] Appl. No.: 536,186

[30] Foreign Application Priority Data

Jan. 14, 1974 Switzerland .......................... 443/74

[52] U.S. Cl. .............................. 252/436; 252/438; 252/439; 252/447; 423/387
[51] Int. Cl.² .......................................... B01J 27/02
[58] Field of Search .......... 252/439, 438, 447, 436

[56] References Cited

UNITED STATES PATENTS 3,803,054  4/1974  Habig et al. ...................... 252/439

Primary Examiner—Patrick P. Garvin
Attorney, Agent, or Firm—Bierman & Bierman

[57] ABSTRACT

Novel platinum catalysts and a method for their preparation are disclosed. They are prepared by treating catalysts of platinum metal with salts of sulfurous acid or with sulfur compounds which liberate sulfurous acid in the presence of an acid. The treatment is conducted in the presence of hydroxylammonium salts in acid medium and in the absence of oxidizing agents capable of oxidizing sulfurous acid to form sulfate. The resulting catalysts are useful in preparing hydroxylamine.

7 Claims, No Drawings

PROCESS FOR PREPARING PLATINUM METAL CATALYSTS

The present invention relates to novel catalysts containing platinum metal, to a process for their preparation and to the use of these catalysts for preparing hydroxylammonium salts by catalytic hydrogenation of nitric oxide in acid medium.

It is known that catalysts containing platinum metal catalyze the hydrogenation of nitric oxide in acid medium to give hydroxylammonium salts. In addition to the desired hydroxylammonium salts, part of the nitric oxide is reduced to ammonium salts, nitrogen and laughing gas. These undesired by-products impair the yield of hydroxylamine and are detrimental to the economy of commercial operation of the process.

Proposals which render possible a more selective reduction of nitric oxide to give hydroxylamine in acid medium with the use of catalysts containing platinum metal are known and consist, inter alia, in the inclusion of the elements As, Se, Sb, Te, S or Bi in accordance with German Patent Specification No. 956,038 (or British Pat. No. 772,693), and the elements Hg, As, Sb, and Bi in accordance with Japanese Pat. No. 54 750/1966.

It has now been discovered that platinum catalysts can be prepared having a surprisingly high degree of selectivity in converting nitric oxide to hydroxylammonium salts, thereby affording these salts in surprisingly high degrees of purity. This discovery, which resulted in the present invention, comprises treating a platinum catalyst with a salt of sulfurous acid or with a sulfur compound which liberates sulfurous acid when in the presence of an acid. The treatment is conducted in the presence of hydroxylammonium salts in an acid medium, and oxidizing agents capable of oxidizing sulfurous acid to form sulfate (such as oxygen) are substantially excluded. Preferably the sulfur compounds amount to 1 to 15 atom % sulfur, based on the weight of the Pt metal present.

The absence of oxidizing agents can be ensured by purging the catalyst suspension in the acid hydroxylammonium salt solution with an inert gas, for example argon or nitrogen. Preferably, at least 2.5 liter of inert gas or hydrogen per liter of catalyst suspension per hour are employed. This purging is performed prior to the treatment with the sulfur compounds.

Primarily, conventional preparations may be employed as catalysts, such as platinum on activated charcoal, graphite or other supports which are stable in acid medium, but many other catalytic Pt preparations can also be used.

According to the invention, the catalysts containing platinum metal may also first be treated with the sulphur compounds in acid medium and then with the hydroxylammonium salts, the absence of oxidizing agents still being necessary in order to obtain the desired beneficial results.

After the treatment, the catalysts may be isolated in conventional manner or may be employed in situ immediately following the treatment. This latter use is preferred for the catalytic hydrogenation of nitric oxide to give hydroxylamine in acid solution.

Sulfur compounds which liberate $H_2SO_3$ in acid medium include the salts of sulfurous acid, of dithionous acid $H_2S_2O_4$ and of thiosulfuric acid. Preferred salts are those of alkali metals such as lithium, sodium, potassium, etc.

The amount of added sulfur compounds preferably provides 10–15 atom % sulfur, referred to the amount of platinum metal used.

The treatment of the catalysts is suitably effected in a solution having a concentration of 1 to 5N hydroxylammonium salts and 0 to 5N sulfuric acid.

The treatment is preferably effected in a solution of 2 to 4N hydroxylammonium salts in 0.5 to 2N sulfuric acid; hence, the preferred hydroxylammonium salt is hydroxylammonium sulfate.

If the catalysts are first treated with the sulfur compounds in acid medium, the preferred concentration of sulfuric acid is 1 to 5N. The details given above apply as regards the concentration of hydroxylammonium salts.

The temperature is held between 15° and 100° C during the treatment.

To achieve the desired effects, it is advisable to carry out the treatment over a period of 0.1 to 15 hours (0.5 to 5 hours being the preferred treatment period) before the catalyst is isolated or used directly for the reducing reaction.

The treatment of the catalyst with the sulphur compounds is preferably carried out under a protective gas, for example nitrogen. The protective gas should be supplied as slowly as possible (1 liter of nitrogen per liter of catalyst suspension per hour at the most).

Special advantages of the platinum metal-containing catalysts obtained as specified, as compared with untreated catalysts, are markedly increased selectivity and/or improved activity, in particular in the hydrogenation of NO to give hydroxylamine.

The following Examples illustrate preferred embodiments of the present invention, but are in no way to be construed as limiting it.

EXAMPLE 1

2 liters of an aqueous solution of the following composition are placed in a 2-liter stirring reaction vessel:
3.1N hydroxylammonium sulfate
0.4N ammonium sulfate
1.0N sulfuric acid
7.0 g of 1.0% platinum on activated carbon as support per liter of reaction vessel solution are added as catalyst. 40 l of nitrogen gas are passed into the suspension during a period of 1 hour. The amounts of $Na_2SO_3$ listed in Table 1 are added and the suspension is stirred for 1 hour at 25° to 30° C under $N_2$ atmosphere.

After the treatment, a mixture consisting of 25 standard liters of nitric oxide and 75 standard liters of $H_2$ per hour is passed in at 40° C. The duration of the reaction is 8 hours. The concentration of acid is kept constant by hourly removal of product and addition of sulfuric acid (about 4.8N). Table 1 gives the respective activities, selectivities and yields of the treated catalysts and, as a comparison, the corresponding details relating to an untreated catalyst.

TABLE 1

Catalyst: 1.0% platinum on activated carbon
Additive: $Na_2SO_3$ (0.1% aqueous solution)

| mg of additive per 100 g of catalyst | Atom % sulfur referred to platinum | Conversion of nitric oxide % | Selectivity $(NH_3OH)_2SO_4$ / $(NH_4)_2SO_4$ | Yield % $(NH_3OH)_2SO_4$ | Yield % $(NH_4)_2SO_4$ | $N_2O/N_2$ | Volume-time yield g$(NH_3OH)_2SO_4$ per liter hour |
|---|---|---|---|---|---|---|---|
| 32.5 | 5 | 78 | 5 | 78.3 | 15.7 | 6.0 | 27.8 |
| 65.0 | 10 | 80.2 | 9.55 | 86 | 9.0 | 5.0 | 31.5 |
| 97.5* | 15* | 76.9 | 18.9 | 92.4 | 4.9 | 2.70 | 32.4 |
| Comparison test without additive | 0 | 76.9 | 3 | 69.4 | 22.8 | 7.8 | 24.2 |

*The additive was added to the catalyst in portions.

|  | Conversion of nitric oxide (%) | Selectivity $(NH_3OH)_2SO_4$ / $(NH_4)_2SO$ | Yield $(NH_3OH)_2SO_4$ | Yield $(NH_4)_2SO_4$ | $N_2O/N_2$ | Volume-time yield g $(NH_3OH)_2SO_4$ per liter hour |
|---|---|---|---|---|---|---|
| Catalyst treated | 78 | 6.1 | 79 | 13 | 8 | 28.2 |
| Catalyst untreated (comparison test) | 76.9 | 3.0 | 69.4 | 22.8 | 7.8 | 24.2 |

EXAMPLE 2

5.75 liters of an aqueous solution of the following composition are placed in a 10-liter stirring reaction vessel:

3.1N hydroxylammonium sulfate
0.4N ammonium sulfate
1.0N sulfuric acid 650 g of 1% platinum on activated carbon as support are added. About 200 l of nitrogen gas are passed into the suspension during a period of 2 hours while stirring. The amount of $N_2$ is thereafter reduced to 5 l/h and the stream of gas ceases to flow through the suspension, merely over the surface of the liquid. 100 ml of aqueous $Na_2SO_3$ solution (0.420 g of $Na_2SO_3$ in 100 ml of $H_2O$; corresponds to 10 atom % sulfur referred to platinum) are passed into the reaction vessel dropwise in 1/2 hour. The suspension is stirred for 1 hour at 30° C under nitrogen. The catalyst is then filtered off and washed until the wash water is free from sulfate anions.

The treated catalyst is used for hydrogenation of nitric oxide in accordance with Example 1. The activity, selectivity and yields for the treated and untreated catalyst are as follows:

EXAMPLE 3

2 liters of an aqueous solution of the following composition are placed in a 2-liter stirring reaction vessel:

3.5N hydroxylammonium sulfate
0.4N ammonium sulfate
1.0N sulfuric acid 7.0 g of 1.0 platinum on activated carbon as support per liter of reaction vessel solution are added as catalyst. 40 l of nitrogen gas are passed into the suspension during a period of 1 hour. The additions given in Table 2 are made and the suspension is stored for 1 hour under $N_2$ atmosphere at 25 – 30° C. The hydrogenation of nitric oxide is carried out in accordance with Example 1.

Table 2 shows the respective activities, selectivities and yields of the treated catalysts and, as comparison, the corresponding data for an untreated catalyst.

Table 2

| Additive | mg of additive per 100 g catalyst | Conversion nitric oxide (%) | Selectivity $(NH_3OH)_2SO_4$ / $(NH_4)_2SO_4$ | Yield $(NH_3OH)_2SO_4$ | Yield $(NH_4)_2SO_4$ | $N_2O/N_2$ | Volume-time yield g $(NH_3OH)_2SO_4$ per liter hour |
|---|---|---|---|---|---|---|---|
| $Na_2S_2O_4 \cdot H_2O$ | 49 (10 atom % sulfur referred to platinum) | 79 | 8.75 | 83.0 | 9.5 | 7.5 | 30.0 |
| $Na_2S_2O_3 \cdot 5H_2O$ | 64.0 (10 atom % sulfur referred to platinum) | 77 | 8.2 | 82.0 | 10.0 | 8.0 | 28.7 |
| Comparison test without addition | 0 | 76.9 | 3 | 69.4 | 22.8 | 7.8 | 24.2 |

What is claimed is:

1. A process for preparing an improved platinum metal catalyst which comprises contacting a platinum catalyst having a support selected from the group consisting of activated charcoal and graphite, with a. a sulfur-containing compound containing 1–15 atom % sulfur based on the weight of the platinum metal which liberates sulfurous acid under acidic conditions, and b. a hydroxylammonium salt having a concentration of 1–5N, at a temperature of 15–100° C., the process being conducted in an acid medium and substantially in the absence of oxidizing agents capable of oxidizing sulfurous acid to form sulfate.

2. The process of claim 1 in which the sulfur-containing compound is a salt of sulfurous acid, dithionous acid, thiosulfuric acid or mixtures thereof.

3. The process of claim 1 in which the sulfur compound is present in an amount corresponding to 10 to 15 atom percent sulfur based on the amount of platinum metal.

4. The process of claim 1 in which the hydroxylammonium salt is sulfate and the medium is made acidic by means of sulfuric acid.

5. The process of claim 4 in which the hydroxylammonium salt is present in a concentration of to 1 to 5N, and sulfuric acid is present in a concentration of 0.5 to 2N.

6. The process of claim 1 in which the process is conducted under an atmosphere of inert gas.

7. An improved platinum metal-containing catalyst which comprises a catalyst produced in accordance with the process of claim 1.

* * * * *